United States Patent [19]
Anderson

[11] 3,971,467
[45] July 27, 1976

[54] CONVEYOR ASSEMBLY FOR MOVING ARTICLES

[75] Inventor: Andrew W. Anderson, West Caldwell, N.J.

[73] Assignee: Scandia Packaging Machinery Company, Clifton, N.J.

[22] Filed: Feb. 4, 1975

[21] Appl. No.: 547,065

[52] U.S. Cl. .............................. 198/164; 198/160
[51] Int. Cl.² .................. B65G 15/06; B65G 15/20
[58] Field of Search ............... 53/48, 235; 198/165, 198/168, 160, 162, 164; 83/409

[56] References Cited
UNITED STATES PATENTS

| | | | |
|---|---|---|---|
| 2,706,031 | 4/1955 | Capstoel et al. ............... | 198/165 X |
| 3,176,442 | 4/1965 | Ganz ....................................... | 53/48 |
| 3,367,086 | 2/1968 | Ganz ....................................... | 53/48 |

*Primary Examiner*—Leon Gilden
*Attorney, Agent, or Firm*—Neil F. Markva

[57] ABSTRACT

The conveyor assembly is used in conjunction with the packaging machine for moving articles to an article receiving station. The assembly comprises a means for moving at least one article along the path to receiving means located at an article receiving station. The moving means includes a conveyor means, stabilizing means and pushing means. The stabilizing means and pushing means are disposed on the conveyor means to travel in a forward direction for effecting controlled movement of the article along the path. The pushing means is effective to engage the following side of the article for moving the article into the receiving station. The stabilizing means is effective to engage opposing sides of the article for maintaining a predetermined alignment of the article while the article is moved into the receiving station. Other features of the invention are directed to the particular shape of the stabilizing means and its location with respect to the pushing means. Another feature is directed to the use of a guide rail means in conjunction with a pair of endless, closed loop conveyors.

10 Claims, 6 Drawing Figures

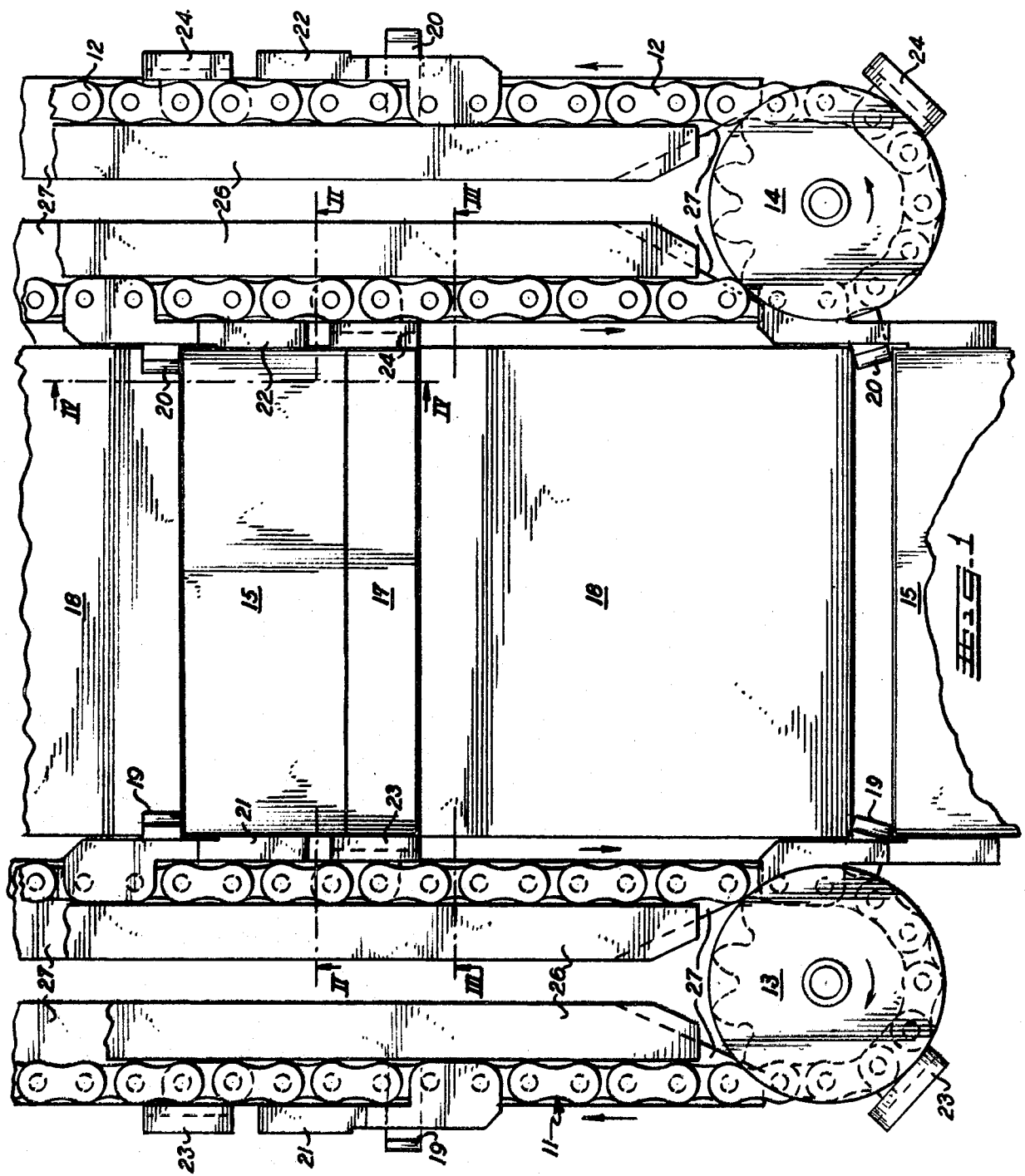

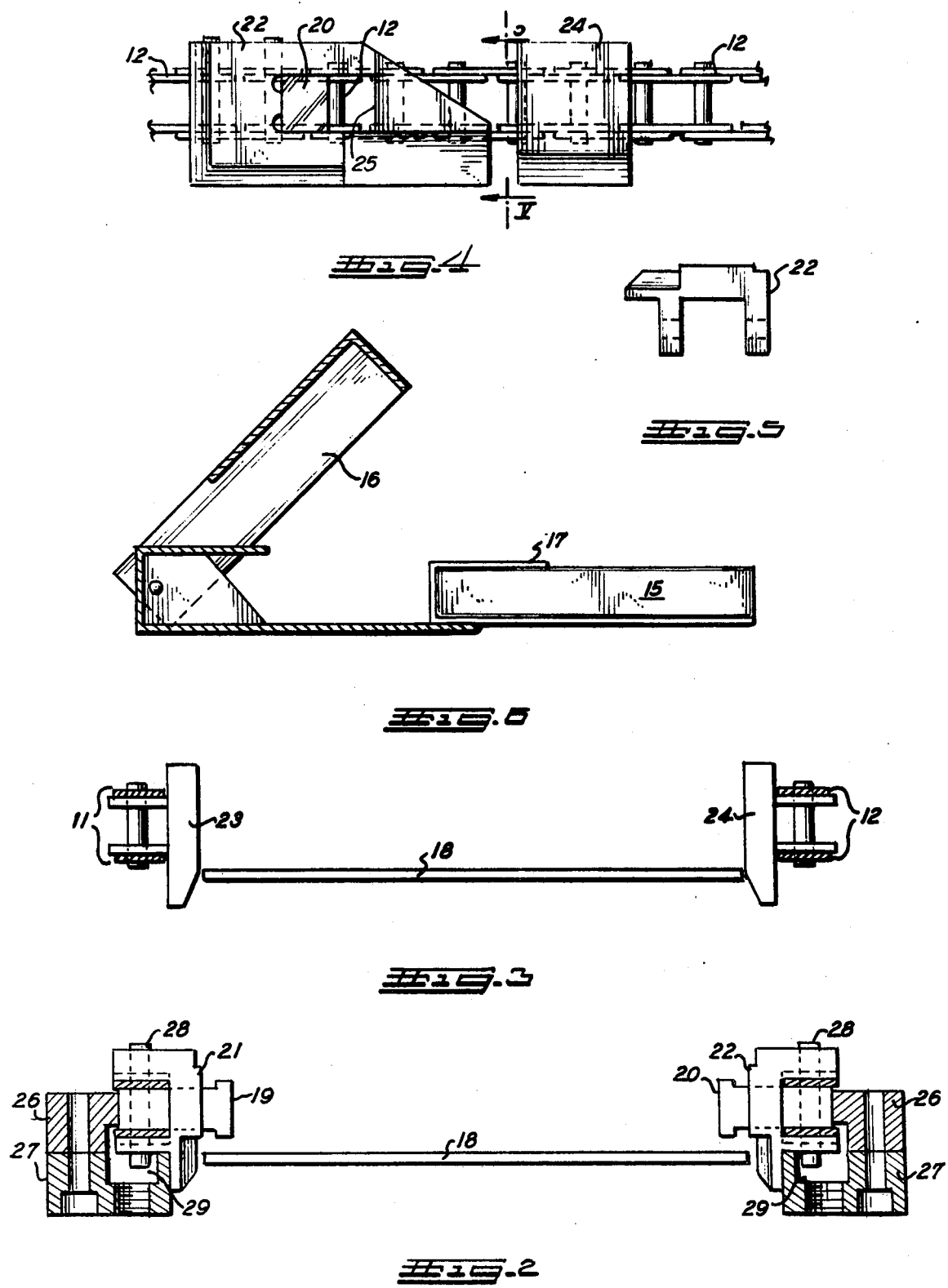

CONVEYOR ASSEMBLY FOR MOVING ARTICLES

BACKGROUND OF THE INVENTION

The use of a pushing device to provide a supply of packages in a wrapping machine is well known in the prior art. Examples of such wrapping machines are found in U.S. Pat. Nos. 2,373,655 and 3,055,490. In each of these prior art structures, a single transverse bar is used in combination with a double endless chain mechanism to move packages from a supply location into a receiving means. The receiving means in each of these prior art patents is a turret wheel assembly used for wrapping packages.

This type of pushing mechanism has disadvantages when it is desired to move an article along a path to a receiving station where the article must be maintained in a particular alignment while being placed in the receiving station. This type of situation occurs where an article is being placed into another container. For example, it is common to place cassette tapes into box-type containers having hinged or pivotally mounted cover members. There has been a problem in maintaining the control of the cassette between the time that it is pushed forward to the entrance of the article receiving station and the placement thereof inside the cartridge container.

PURPOSE OF THE INVENTION

The primary object of this invention is to provide a conveyor assembly which moves an article along a path and maintains its control for a brief moment of time after the article has been placed into the article receiving station.

Another object of this invention is to provide a conveyor means which is operable at extremely high rates of operation while maintaining alignment of the article as it leaves the conveyor path and enters into an article receiving station.

A further object of this invention is to provide a conveyor assembly having a stabilizing means cooperating with a pushing means in combination with a pair of endless, closed loop conveyors.

SUMMARY OF THE INVENTION

This invention relates to a conveying means useable in combination with a packaging operation to insure an alignment of the article as it leaves the conveying means into an article receiving means. The combination of elements includes a means for moving at least one article along a path to an article receiving station and means for receiving the article at the receiving station. The article moving means includes a conveyor means, stabilizing means and pushing means. The stabilizing means and the pushing means are disposed on the conveyor means to travel in a forward direction for effecting controlled movement of the article along the path. The pushing means is effective to engage the following side of the article for moving the article into the receiving station. Stabilizing means is effective to engage opposing sides of the article for maintaining a predetermined alignment of the article while the article is moved from the conveying means into the receiving station.

Another feature of the invention is directed to the particular stabilizing means which includes a pair of stabilizing elements one of which is disposed on each of the closed loop means at corresponding locations along the path to register with the opposing sides of the article. The elements are maintained in contact with the opposing sides of the article until the article has entered the article receiving station.

Another feature of the invention is directed to the configuration of the pushing means which includes a pair of pusher elements pivotally attached to each of the closed loop means at corresponding locations along the path to effect the pushing engagement with the following side of the article. The pusher elements are pivotally attached at a location ahead of the pivotal attachment for the stabilizing elements in the direction of movement along the path. The stabilizing elements have an elongated portion which is disposed ahead of the pusher elements to accomplish the desired results.

In a specific embodiment of the invention, the conveyor means comprises a pair of endless, closed loop chains and article support means and guide rail means. The guide rail means includes a first pair of elongated guide rails for laterally supporting the chains on the side opposite the article support means that is disposed between the chains. A second pair of elongated guide rails are disposed below the pair of chains for laterally supporting the chains on the same side as the article support means. A pin projecting from the chains extends into a channel located in the second pair of guide rails to effect further desired lateral support for the chain conveyor.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 1 is a fragmentary top plan view of an assembly made in accordance with this invention, FIG. 2 is a fragmentary sectional view taken along line II—II of FIG. 1 and shown without the package, FIG. 3 is a fragmentary sectional view taken along line III—III of FIG. 1 and shown without the package, FIG. 4 is a fragmentary sectional view taken along line IV—IV of FIG. 1, FIG. 5 is a sectional view of a stabilizing element as seen along line V—V of FIG. 4, and FIG. 6 is a diagrammatic elevational view showing the placing of package into a container as effected by an assembly made in accordance with this invention.

DESCRIPTION OF SPECIFIC EMBODIMENTS

More specifically, referring to the drawings, the conveyor assembly, generally designated 10, includes a pair of endless, closed loop chains 11 and 12. Sprocket members 13 and 14 are disposed at the end of the path of travel for the articles 15 at the entrance to an article receiving station. The sprocket elements 13 and 14 constitute means for changing the direction of travel for each of the loop chains 11 and 12, respectively, at the entrance to the article receiving station.

In this embodiment, a cassette holder or case 16 is disposed as shown in FIG. 6 for receiving a cassette 15. A label is draped around the leading side of the cassette 15. As shown in FIG. 6, the case 16 is disposed in an open position as shown within the article receiving station.

The packages or cassettes 15 are moved along a support platform 18 disposed between the pair of closed endless, closed loop chains 11 and 12. Pusher elements 19 and 20 are pivotally attached to each of the chains 11 and 12, respectively, at corresponding locations along the path of movement to effect the engagement with the following side of the article or package 15. In this embodiment, the pusher elements 19 and 20 are pivotally mounted on a pin member extending through one end of the element. Alternatively, it is apparent that the pusher element may be pivotally mounted at each of the joining pins used to hold the links of the chain together.

A pair of stabilizing elements 21 and 22 constitutes stabilizing means effective to engage opposing sides of the article or package 15 for maintaining a predetermined alignment of the article 15 as it moved into the receiving station. In this embodiment, the package 15 is disposed within a case as shown in FIG. 6. The elements 21 and 22 are disposed on each of the closed loop chains 11 and 12, respectively, as shown. The elements 21 and 22 have an elongated portion extending forwardly in the direction of movement along the path to effect the desired registration with the opposing sides of the article 15. Another portion of the stabilizing elements 21 and 22 is actually formed as a link in the respective chain and has the same coupling action as any other link in the chain.

In this embodiment, auxiliary stabilizing elements 23 and 24 operate to stabilize the label 17 which is draped over the forward or leading side of the package 15. Each of the stabilizing elements 21 and 22 includes an opening 25 as shown in FIG. 4. The pusher elements 19 and 20 extend therethrough and are free of any frictional contact with the stabilizing elements 21 and 22. As shown, the pusher elements 19 and 20 are pivotally attached at a location ahead of the pivotal attachment for the stabilizing elements 21 and 22, respectively, in the direction of movement along the path and behind the elongated portions of the elements 21 and 22. The stabilizing elements 21 and 22 also include a guide portion that extends below the article support platform 18 as shown in the cross-sectional view of FIG. 2.

The conveyor assembly 10 also includes a guide rail means comprising two pairs of elongated guide rails 26 and 27. The first pair of guide rails 26 extends the length of the path of movement for the articles 15 and laterally supports the chains 11 and 12 on the side opposite the article support platform 18. The second pair of elongated guide rails 27 is disposed below a pair of chains 11 and 12 and laterally supports them on the inside thereof. Each of the guide rails 27 includes a channel 29 which extends along each side of the article support platform 18. The stabilizing means includes pins 28 which extend through the chains 11 and 12 and project into the channels 29 which provide additional support and guidance with respect to the closed loop conveyor chains 11 and 12 as they move the packages 15 along platform 18. In this particular embodiment the guide rails 27 are made of brass since there is a frictional contact of the guide portion of the stabilizing elements 21 and 22 therealong.

In operation, the package 15 is carried along by the pusher elements 19 and 20 to the entrance of the article receiving station. As the chains 11 and 12 effect the change of direction around the sprockets 13 and 14, respectively, the pusher elements 19 and 20 begin to swing away from the path of movement as shown. The openings 25 are large enough for the pivotal action of the pusher elements 19 and 20 to be effected without interfering with the operation of the stabilizing elements 21 and 22. The elongated portions of the elements 21 and 22 are maintained against the opposing sides of the package 15 as shown until the forward pivot point of the link to which it is attached begins to move around the circumference of the sprocket members 13 and 14. At this point, the package 15 has been maintained in a particular alignment to enter into the container. The stabilizing elements 21 and 22 then swing around away from the side of the elements. This same type of movement is shown to have already been effected with respect to the auxiliary stabilizing elements 23 and 24 after the package has been placed in the article receiving station.

While the conveyor assembly for moving articles has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. In a packaging machine, the combination comprising:
   a. means for moving at least one article along a path to an article receiving station, and
   b. means for receiving said article at said receiving station,
   c. said moving means including a conveyor means, stabilizing means and pushing means,
   d. said stabilizing means and said pushing means being disposed on the conveyor means to travel in a forward direction for effecting controlled movement of the article along said path,
   e. said pushing means being effective to engage the following side of the article for moving the article into the receiving station,
   f. said stabilizing means at corresponding locations along each side of said path and being effective to engage opposing sides of the article for maintaining a predetermined alignment of the article while the article is moved away from the article moving means into the receiving station.

2. In a packaging machine as defined in claim 1 wherein
   the conveyor means comprises a pair of endless, closed loop means,
   said stabilizing means includes a pair of stabilizing elements,
   one of said stabilizing elements being disposed on each of the closed loop means at corresponding locations along the path to register with the opposing sides of the article.

3. In a packaging machine as defined in claim 1 wherein
   the conveyor means comprises a pair of endless, closed loop means and means to change the direction of travel for each of the loop means at the entrance to the article receiving station,
   said stabilizing means includes a pair of stabilizing elements with one of the elements being disposed on each of the closed loop means at corresponding locations along the path to register with the opposing sides of the article,
   said elements being maintained in contact with the opposing sides of the article until the article has entered the article receiving station.

4. In a packaging machine as defined in claim 1 wherein the conveyor means comprises a pair of endless, closed loop means, and said stabilizing means includes a pair of elongated stabilizing elements pivotally attached to each of the closed loop means at corresponding locations along the path to register with opposing sides of the article.

5. In a packaging machine as defined in claim 4 wherein the pushing means includes a pair of pusher elements pivotally attached to each of the closed loop means at corresponding locations along the path to effect said engagement with the following side of the article.

6. In a packaging machine as defined in claim 1 wherein said stabilizing means includes a pair of stabilizing elements pivotally attached to each of the closed loop means at corresponding locations along the path, each said element having an elongated portion extending forwardly in the direction of movement along the path to register with opposing sides of the article, said pusher element being pivotally attached at a location ahead of the pivotal attachment for the stabilizing elements in the direction of movement along the path and behind the elongated portion.

7. In a packaging machine as defined in claim 1 wherein the conveyor means comprises a pair of endless, closed loop means and an article support means extending the length of the path, said stabilizing means includes a pair of stabilizing elements pivotally attached to each of the closed loop means at corresponding locations along the path, each said element having an elongated portion extending forwardly in the direction along the path to register with opposing sides of the article and a guide portion extending below the article support means.

8. In a packaging machine as defined in claim 1 wherein the conveyor means comprises a pair of endless, closed loop chains, an article support means and guide rail means, said stabilizing means includes a pair of stabilizing elements wherein each element is attached to a link on the chain at corresponding locations along the path, said guide rail means includes a first pair of elongated guide rails for laterally supporting the chains on the side opposite the article support means disposed between the chains and a second pair of elongated guide rails disposed below the pair of chains for laterally supporting the chains on the same side as the article support means.

9. In a packaging machine as defined in claim 8 wherein each of the guide rails of said second pair forms a channel extending along each side of the article support means and stabilizing means includes pins extending through the chains and projecting into said channels.

10. An assembly for moving articles to an article receiving station in a packaging operation, comprising:

a. means for moving at least one article along a path to an article receiving station, and b. means for receiving said article at the receiving station, c. said moving means including a conveyor means, stabilizing means and pushing means, d. said stabilizing means and said pushing means being disposed on the conveyor means to travel in a forward direction for effecting controlled movement of the article along said path, e. said pushing means being effective to engage the following side of the article for moving the article into the receiving station, f. said stabilizing means at corresponding locations along each side of said path and being effective to engage opposing sides of the article for maintaining a predetermined alignment of the article while the article is moved away from the article moving means into the receiving station.

* * * * *